United States Patent [19]

Shimada

[11] Patent Number: 4,520,346

[45] Date of Patent: May 28, 1985

[54] METHOD AND APPARATUS FOR ENCODING AN NRZI DIGITAL SIGNAL WITH LOW DC COMPONENT

[75] Inventor: Toshiyuki Shimada, Atsugi, Japan

[73] Assignee: Sony Corporation, Tokyo, Japan

[21] Appl. No.: 371,284

[22] Filed: Apr. 23, 1982

[30] Foreign Application Priority Data

Apr. 24, 1981 [JP] Japan ............................ 56-62726

[51] Int. Cl.³ ................................... H03K 13/24
[52] U.S. Cl. ............................ 340/347 DD; 360/40
[58] Field of Search ............... 340/347 DD; 375/19; 360/40–44; 371/55

[56] References Cited

U.S. PATENT DOCUMENTS

| Re. 31,311 | 7/1983 | Miller | 360/40 |
| 3,405,235 | 10/1968 | Carter | 371/55 |
| 3,581,297 | 5/1971 | Behr et al. | 60/40 |
| 3,697,874 | 10/1972 | Kaneko | 375/19 |
| 3,753,113 | 8/1973 | Maruta et al. | 340/347 DD |
| 3,902,117 | 8/1975 | Sheppard | 375/19 |
| 4,343,023 | 8/1982 | Nishimura et al. | 360/40 |
| 4,369,516 | 1/1983 | Byrns | 360/40 |
| 4,387,364 | 6/1983 | Shirota | 360/40 |

Primary Examiner—Errol A. Krass
Assistant Examiner—Thomas G. Black
Attorney, Agent, or Firm—Lewis H. Eslinger; Alvin Sinderbrand

[57] ABSTRACT

Successive n-bit information words are converted into successive m-bit NRZI code words by assigning to each n-bit information word at least one m-bit code word having a respective NRZI disparity. The digital sum variation of the preceding m-bit NRZI code words is determined and the polarity of the conclusion of the immediately preceding m-bit NRZI code word is detected. An assigned m-bit code word is selected to represent the next n-bit information word as a function of the NRZI disparity of that code word, the determined digital sum variation and the detected polarity. The selected m-bit NRZI code word then is modulated in NRZI format such that the modulated code word has the same initial polarity as the detected polarity. The m-bit code word is selected such that its NRZI disparity, when combined with the determined digital sum variation, tends to prevent the digital sum variation from increasing.

29 Claims, 17 Drawing Figures

| DSP+ | (ENT+) | NO. OF TYPE I CODE WORDS |
|---|---|---|
| 9 | 1 | |
| 8 | 1 | |
| 7 | 8 | |
| 6 | 8 | |
| 5 | 28 | |
| 4 | 28 | ---(4) |
| 3 | 56 | |
| 2 | 56 | 182 } 256 |
| 1 | 70 | |
| 0 | 70 | |
| -1 | 56 | |
| -2 | 56 | |
| -3 | 28 | |
| -4 | 28 | |
| -5 | 8 | 186 } 256 |
| -6 | 8 | |
| -7 | 1 | |
| -8 | 1 | |
| -9 | 0 | |

| DSP+ | (ENT+) | NO. OF TYPE II CODE WORDS |
|---|---|---|
| 9 | 1 | |
| 8 | 0 | |
| 7 | 9 | |
| 6 | 0 | |
| 5 | 36 | } 256 |
| 4 | 0 | |
| 3 | 84 | |
| 2 | 0 | |
| 1 | 126 | |
| 0 | 0 | |
| -1 | 126 | |
| -2 | 0 | |
| -3 | 84 | |
| -4 | 0 | |
| -5 | 36 | } 256 |
| -6 | 0 | |
| -7 | 9 | |
| -8 | 0 | |
| -9 | 1 | |

| DSV\ENT DSP+ | DSV>0 ENT>0 | DSV>0 ENT<0 | DSV=0 ENT>0 | DSV=0 ENT<0 | DSV<0 ENT>0 | DSV<0 ENT<0 |
|---|---|---|---|---|---|---|
| (1) 0 | O | O | O | O | O | O |
| (2) + | | O | | | O | |
| (2) 0 | O | | O | O | | O |
| (3) 0 | | O | O | O | O | |
| (3) − | O | | | | | O |
| (4) + | | O | O | O | O | |
| (4) − | O | | O | O | | O |
| (5) + | | O | | | O | |
| (5) 0 | | | O | O | | |
| (5) − | O | | | | | O |

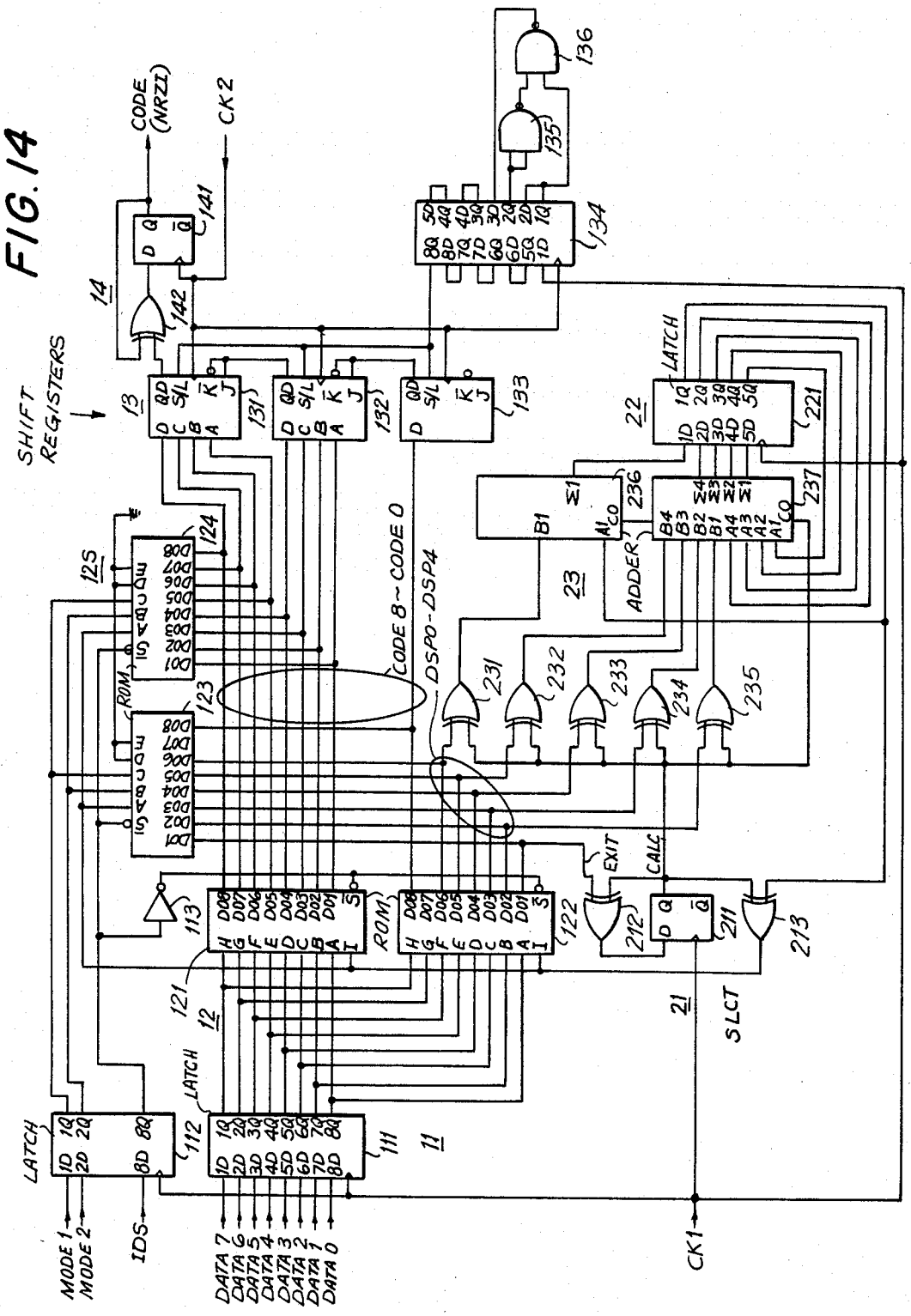

METHOD AND APPARATUS FOR ENCODING AN NRZI DIGITAL SIGNAL WITH LOW DC COMPONENT

BACKGROUND OF THE INVENTION

This invention relates to a method and apparatus for encoding an n-bit information word (n≧2) into an m-bit NRZI code word (m>n), wherein the DC component of successive NRZI code words is minimized.

In many applications, a digital signal formed of a number of binary "1"s and "0"s is represented in a non-return-to-zero (NRZ) format. Such NRZ digital signals may be transmitted from one location to another directly, and may even be recorded on a magnetic medium without further modulation. To reduce errors that may be caused by dropouts, distortions, and the like of the NRZ signal, the digital information may be additionally encoded in any one of a number of error-correcting codes.

Recently, digital recording techniques have been used for the high fidelity recording of video signals. In a digital video tape recorder (DVTR), the video signal, which normally is in analog form, is converted to a corresponding digital video signal, and the digital video signal may be encoded in an error-correcting code and then recorded in NRZ format. In one DVTR, the digital video signals are formed as 8-bit signals and a number of successive 8-bit signals are recorded. For synchronizing, error-detecting and error-correcting purposes, the 8-bit digital video signal also is interspersed with digital synchronizing signals, patterns, and the like.

In magnetic recording, as well as in various signal transmission systems, a DC signal is neither recorded nor reproduced accurately. Hence, when digital signals are provided in NRZ format, the magnetic recording of such signals generally is constrained to the recording of the bit transitions therein. That is, the change-over in the digital signal between a binary "0" and a binary "1" is recorded. However, the constant positive or negative DC level of the binary "1" and "0" is lost. Therefore, distortion may be introduced into the recorded NRZ signal, and additional distortion is present when the recorded signal is reproduced.

Because of the foregoing disadvantages in magnetic recording and in some signal transmission systems, it is desirable to encode an information word, such as an 8-bit digital video signal, in a form which avoids or compensates for many of such disadvantages. For example, it is desirable to minimize distortion that may be present if a long run-length of binary "0"s and "1"s is present. Although there may be no practical control over the run-length of the original information words, such words may be encoded so as to be represented by code words that avoid long run-lengths. Thus, an information word which consists of all "0"s or all "1"s may be represented by a code word having a number of bit changeovers therein. This means that such code words will be formed of a larger number of bits (e.g. m bits) than the number of bits (e.g. n bits) which constitute the information word.

In addition to avoiding long run-lengths, another desirable characteristic of some encoding techniques that have been proposed is to minimize the effective DC component of successive code words. For example, in the NRZ format, if a binary "1" is represented by a DC level of +1 volt and a binary "0" is represented by a DC level of −1 volt, then the overall DC component, or disparity, of a digital word is obtained by summing the DC levels which represent the bits included in that word. If the disparity of a digital word is positive, then the number of binary "1"s included therein exceeds the number of "0"s in that word. Conversely, if the disparity is negative, then the number of binary "1"s is less than the number of binary "0"s in that word. Over a period of time, the summation of the disparities of successive digital words results in a positive, negative or zero value that is a direct representation of the overall DC component of such words. This accumulation of disparities is known as the digital sum variation (DSV). It is appreciated that if each digital word is formed of an odd number of bits, then each digital word will exhibit non-zero disparity. The accumulation of such disparities, that is, the digital sum variation, if not controlled, may become excessively positive or negative. Thus, the DC component of the digital signal formed of successive digital words may become excessively positive or negative.

A large DC component in digital signals is to be avoided in those systems, such as magnetic recording, wherein a DC component is not accurately maintained. This is because large DC components result in distortion, as mentioned above, thereby imparting errors into the recovered digital signal. One technique for maintaining a low DC component in the DC signal is known as low disparity encoding. In this technique, an input digital information word is converted to a code word having a substantially greater number of bits than the information word and, moreover, the code word being formed of an even number of bits. A known low disparity code is the so-called (4, 6; 0) code, wherein a 4-bit information word is represented by a 6-bit information word, each information word exhibiting zero disparity. It is recognized that the (4, 6; 0) code is easily attainable because sixteen different information words may be represented by a 4-bit word; and in a 6-bit code word there are twenty individual words which exhibit zero disparity. Thus, there are more than enough 6-bit zero disparity code words to represent the 4-bit information words. Also, the run-lengths of the 6-bit code words are relatively small.

However, in the (4, 6; 0) low disparity code, a large number of bits of the code word are provided merely to make sure that the disparity of that word is maintained at zero. Such code word bits are not needed to represent useful information and, therefore, they are redundant. These redundant bits, when recorded, occupy an area that otherwise could be used for information. Hence, a relatively high recording density is needed when recording low disparity code signals of the (4, 6; 0) code. Furthermore, since a large number of redundant bits are recorded with this low disparity code, the effective "detecting window", that is, the interval which is available for detecting each bit, is reduced from that which otherwise could be used if the original information word is recorded. For example, in the (4, 6; 0) code, a detecting window whose effective interval is equal to the four information bits now must be used to detect the six code bits. Consequently, there is a greater possibility of introducing error into the reproduced low disparity code word.

Yet another disadvantage of low disparity codes having high redundancy, such as the (4, 6; 0) code, is that if a read only memory (ROM) is used to convert an information word into a code word, the ROM must have a very high storage capacity.

Many of the foregoing disadvantages and difficulties have been overcome by the encoding technique described in copending application Ser. No. 201,781 now abandoned, filed Oct. 29, 1980. The encoding technique described in that application contemplates the conversion of n-bit information words into m-bit code words in the NRZ format. While the encoding technique is successful, thus enabling digital signals to be recorded and reproduced accurately, the use of the NRZ format requires strict control over the polarities of the various components included in the recording or signal processing system. If the polarity of the windings on the recording/reproducing transducer, or head, or the polarity of the recording or playback amplifiers is reversed, then a signal which had been recorded as a binary "1" in the NRZ format may be reproduced as a binary "0". Likewise, if signals had been recorded on a magnetic medium by one recording system and are reproduced by another having different polarity, those signals which originally had been recorded as binary "1"s will be reproduced as binary "0"s, and vice versa. This is because, in the NRZ format, it is the direction of transition from one level to the next that is representative of the binary signal. Thus, a positive transition represents a changeover from a binary "0" to a binary "1" and a negative transition represents a changeover from a binary "1" to a binary "0". In the event of any reversals in the polarity of the magnetic medium, the windings of the record/reproduce transducer, the amplifier circuitry, and the like, the sensed polarity of the transition between binary "1" and "0" likewise will be reversed so as to make the reproduced NRZ signal erroneous.

Because of the foregoing critical dependency of the NRZ format on polarity, the assembly and repair of, for example, a recording or reproducing system must be carried out with great care. Furthermore, this polarity dependency of the NRZ format limits the improvements, or retrofitting, of the recording apparatus.

The foregoing disadvantages of the NRZ format are substantially minimized, or avoided, by modulating the digital signal in nonreturn-to-zero inverted (NRZI) format. As is known, in the NRZI format, a binary "1" is represented by a transition of either positive or negative polarity, and a binary "0" is represented by the absence of a transition. Since it is the transition itself and not the polarity thereof that is representative of the binary signals, the aforementioned polarity dependency and defects of the NRZ format are avoided by using NRZI modulation. However, if n-bit information words merely are modulated in NRZI format and recorded directly without any additional encoding, the above-described disadvantages associated with long run lengths and DC components may result. Consequently, it is advantageous to encode an information word into a low disparity code word, and then modulate that low disparity code word in NRZI format prior to recording, transmission or processing.

OBJECTS OF THE INVENTION

Therefore, it is an object of the present invention to provide an improved method and apparatus for encoding successive information words into NRZI code words having minimal DC component.

Another object of this invention is to provide an improved method and apparatus for encoding an n-bit information into an m-bit NRZI code word which avoids the aforenoted disadvantages and defects.

A further object of this invention is to provide an encoding technique, including NRZI modulation, in which the encoded NRZI signal is provided with a minimum of redundant bits yet exhibits a low overall DC component.

An additional object of this invention is to provide an encoding technique wherein encoded NRZI digital signals are capable of being transmitted accurately through a system which blocks DC signals, such as a magnetic recording system.

A still further object of this invention is to provide a method and apparatus for encoding an information word into an NRZI code word which minimizes error due to the DC component of the information word and, moreover, the NRZI code words are capable of supporting self-clocking.

Various other objects, advantages and features of the present invention will become readily apparent from the ensuing detailed description, and the novel features will be particularly pointed out in the appended claims.

SUMMARY OF THE INVENTION

In accordance with this invention, a method and apparatus are provided for converting successive n-bit information words into successive m-bit NRZI code words. Each n-bit information word is assigned with at least one m-bit code word having a respective NRZI disparity. The digital sum variation of the preceding code words is determined, and the polarity at the conclusion of the immediately preceding m-bit NRZI code word is detected. An assigned m-bit code word is selected to represent the next n-bit information word as a function of the NRZI disparity of the code word and the determined digital sum variation. The selected m-bit code word is modulated in NRZI format such that the modulated code word has the same initial polarity as the detected polarity. The selected m-bit NRZI code word has an NRZI disparity which, when combined with the determined digital sum variation, tends to prevent the digital sum variation from increasing.

In accordance with one embodiment of this invention, each code word is formed of an odd number of bits, the NRZI format is of the type wherein a bit such as a binary "1" is represented by a transition during the central portion of a code bit interval, and some of the n-bit information words are assigned with m-bit code words having zero disparity and other information words are assigned with respective pairs of code words, each pair having a positive NRZI disparity code word and a negative NRZI disparity code word.

In accordance with another embodiment of this invention, the NRZI format represents a predetermined bit, such as a binary "1", with a transition at the beginning of a code bit interval. With this format, if each code word is formed of an odd number of bits, then each information word is represented by a pair of code words, the disparities of the code words in a respective pair being equal and opposite.

In one aspect of this invention, a read only memory (ROM) stores all of the code words which are assigned to the respective information words. The ROM is addressed by the information words and, in addition, by a control signal which determines whether the information word should be represented by a code word having positive or negative disparity. If the digital sum variation which then has been determined, or calculated, from the preceding code words is positive, then the ROM is addressed to produce a code word having negative disparity. This tends to reduce the digital sum variation and, thus, minimize the DC component of the successive code words.

In accordance with another aspect, the NRZI code word may terminate with positive or negative polarity, thus establishing the polarity at the beginning of the next-following code word. The ROM is addressed as a function of this polarity because the disparity of a particular NRZI-modulated code word is dependent upon whether that code word commences with positive or negative polarity.

BRIEF DESCRIPTION OF THE DRAWINGS

The following detailed description, given by way of example, will best be understood in conjunction with the accompanying drawings in which:

FIG. 14 is a logic diagram of a specific embodiment of the present invention.

DETAILED DESCRIPTION OF CERTAIN PREFERRED EMBODIMENTS

Before describing the embodiments of the present invention, a definition of the terms used in the specification and claims is provided. As used herein, the following terms are intended to have the indicated meaning:

*Information Word* refers to an n-bit digital signal, wherein $n \geq 2$. In the examples described below, $n=8$. This 8-bit digital signal represents, for example, a sampled analog signal, such as a sample of a video signal.

*Code Word* refers to the m-bit digital word that represents the n-bit information word, where $m > n$. In the examples described below, $m=9$ and $m=10$.

*Disparity (DSP)* represents the overall, or net, DC component of a digital word. For example, the disparity of an m-bit code word represents the difference between the number of binary "1"s and "0"s included in that word.

*NRZI Disparity* is the disparity of the m-bit code word that has been modulated in NRZI format. This is described further below with respect to FIGS. 1 and 2.

*Digital Sum Variation (DSV)* refers to the DC value that would be obtained by integrating the successive binary "1"s and "0"s of successive digitals signals, such as successive m-bit code words. The DSV of the m-bit NRZI code words likewise refers to the overall, or net, DC value which is obtained from successive NRZI code words. A more detailed definition of disparity and digital sum variation is found in the above-mentioned copending application.

*Entry Polarity (ENT)* refers to the polarity of the NRZI code word at the beginning portion of that word. It will be appreciated that the entry polarity ENT may be positive or negative. Furthermore, the entry polarity ENT of one NRZI code word is equal to the polarity at the conclusion of the immediately preceding NRZI code word.

*Exit Polarity (EXIT)* refers to the polarity at the conclusion of the immediately preceding NRZI code word.

Figure 1:
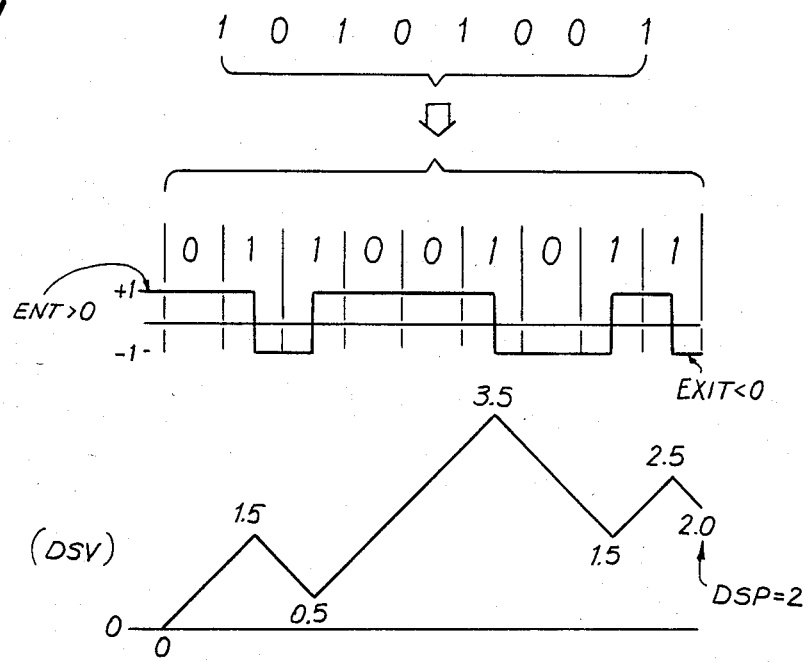
FIG. 1 is a diagrammatic representation of the disparity of a so-called type I NRZI code word.

Turning now to FIG. 1, it is assumed that the 8-bit information word [10101001] is to be represented by the m-bit code word [011001011]. That is, the apparatus of the present invention, as will be described below, encodes the information word [10101001] into the code word [011001011]. FIG. 1 also illustrates the modulation of the 9-bit code word [011001011] in NRZI format.

As mentioned above, and as is appreciated by those of ordinary skill in the art, NRZI modulation represents a bit of one logical sense with a bit transition, and the bit of other logical sense is represented by the absence of a transition. For example, a transition represents a binary "1" and the absence of a transition represents a binary "0". NRZI modulation may be classified as type I and type II. In type I NRZI modulation, the binary "1" is represented by a bit transition which occurs in the substantially central portion of a bit interval. FIG. 1 illustrates the type I NRZI modulation of the 9-bit code word [011001011]. Thus, in the central portion of each bit interval associated with a binary "1", the NRZI waveform is provided with a transition. It is recognized that the polarity of this transition is unimportant; and a binary "1" is represented by a transition which may be either positive (i.e. a rising transition) or negative (i.e. a falling transition). FIG. 1 also illustrates the NRZI code word as having positive entry polarity (ENT+) and negative exit polarity (EXIT−). Depending upon the contents of the code word, the exit polarity may be equal to or opposite the entry polarity. It will be described below that this polarity relationship is dependent upon the disparity of the NRZI code word. For example, if the disparity of a 9-bit NRZI code word is even, the exit polarity will be opposite the entry polarity of that word. However, if the disparity of the 9-bit NRZI code word is odd, then the entry and exit polarities will be the same.

FIG. 1 also illustrates the disparity of the type I NRZI code word [011001011] having positive entry polarity. This NRZI disparity may be derived by integrating the NRZI waveform. Thus, for the first 1.5 bit intervals, the NRZI waveform is positive; and then this waveform changes over to negative polarity for the next bit interval; and then the polarity changes over once again to positive polarity for the next three bit intervals. Then, the waveform changes over to negative polarity for the next two intervals, followed by a changeover to positive polarity for the next one bit interval, and then a further change-over to negative polarity for the final 0.5 bit intervals. The resultant NRZI disparity of the code word illustrated in FIG. 1 thus is DSP=+2.

Although not shown in FIG. 1, it will be appreciated that if the very same code word [011001011] commences with negative polarity (ENT−), the resultant NRZI disparity of the code word will be DSP=−2.

Figure 2:
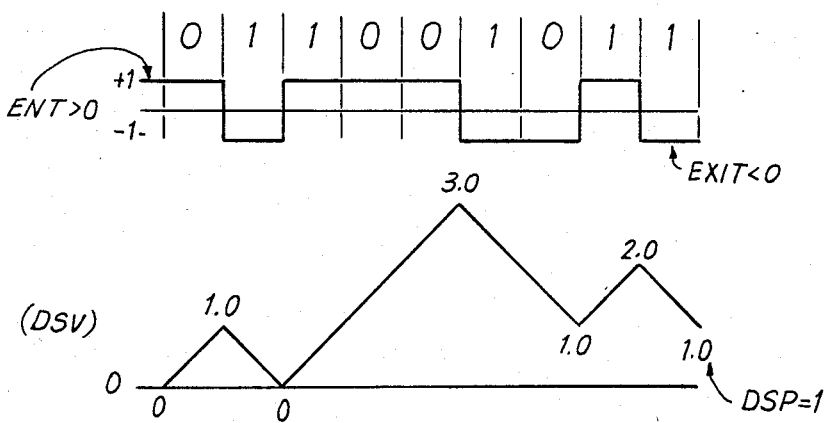
FIG. 2 is a diagrammatic representation of the disparity of a so-called type II NRZI code word.

FIG. 2 represents the waveform that is obtained for the type II NRZI modulation of the code word [011001011]. Here too, it is assumed that the entry polarity is positive (ENT+). In type II NRZI modulation, a binary "1" is represented by the transition at the beginning of the code bit interval. FIG. 2 also illustrates the NRZI disparity for this type II NRZI code word; and it is seen that the disparity may be determined by integrating the NRZI code word waveform. FIG. 2 illustrates the NRZI disparity as DSP=+1.

Thus, for the very same code word, the NRZI disparity thereof is dependent upon whether the code word is modulated in type I or type II NRZI format and, moreover, the NRZI disparity is dependent upon the entry polarity of that NRZI code word. If the type II NRZI code word shown in FIG. 2 commences with negative entry polarity (ENT−), the NRZI disparity thereof will be equal to −1 (DSP=−1). As will be described below, for type II NRZI modulation of a 9-bit code word, the exit polarity thereof is opposite the entry polarity if the NRZI disparity is odd; and the exit and entry polarities are the same if the NRZI disparity is even. In both the type I and II NRZI formats, the absolute value of the NRZI disparity of the code word is the same regardless of the entry polarity thereof; but the polarity, or sign, of the disparity for ENT+ is opposite that for ENT−.

For convenience, in the following discussion, the NRZI disparity for each code word is assumed to be the disparity thereof for positive entry polarity (ENT+). Thus, the NRZI disparity of the code word will be represented as DSP$_+$. The NRZI disparity for the same code word having negative entry polarity (ENT−) is represented as DSP$_-$, and, as mentioned above, DSP$_-$ = −DSP$_+$.

Figures 3, 4, 5:
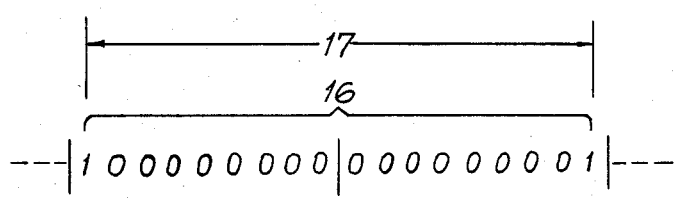
FIG. 3 is a chart representing the number of type I 9-bit code words having the indicated disparity.
FIG. 4 is a diagrammatic representation of the run length of successive 9-bit code words.
FIG. 5 is a chart illustrating the number of type II 9-bit code words having the indicated disparities.

Let it be assumed that an information word is represented by a 9-bit code word. The chart illustrated in FIG. 3 represents the number of type I 9-bit code words having the indicated NRZI disparities. In the chart of FIG. 3, it is assumed that each 9-bit code word exhibits positive entry polarity (ENT+). It is seen that seventy 9-bit code words exhibit zero disparity, seventy 9-bit code words exhibit an NRZI disparity of +1 (DSP$_+$=+1), fifty-six 9-bit code words exhibit an NRZI disparity of +2 (DSP$_+$=+2) and so on. It is further seen from the chart of FIG. 3 that there are a smaller number of 9-bit code words which exhibit a disparity of −1 (DSP$_+$=−1) than there are code words which exhibit a disparity of +1.

If the 9-bit code words are used to represent 8-bit information words, then only a selected number of the available code words are needed in order to represent the 256 information words. In order to minimize the overall DC component, or digital sum variation, of the successive code words which are transmitted or recorded, it is desirable to use all of the zero-disparity code words to represent corresponding information words. Thus, seventy 8-bit information words are represented by seventy 9-bit code words, respectively. Each of the remaining 186 information words is represented by a pair of 9-bit code words, one code word in that pair having positive disparity and the other having negative disparity. The brackets in FIG. 3 represent those non-zero disparity 9-bit code words which are used to represent the information words. It is seen that 182 positive disparity 9-bit code words are encompassed by the group of code words having DSP$_+$=+1, DSP$_+$=+2 and DSP$_+$=+3. The four remaining information words thus may be selected from the twenty-eight 9-bit code words having DSP$_+$=+4. However, it also is seen that all of the available 9-bit code words having negative disparity must be used to represent corresponding information words. Although 186 information words are represented by either of two non-zero disparity 9-bit code words, each code word represents one and only one information.

From the chart of FIG. 3, it is appreciated that seventy 8-bit information words are represented by seventy zero disparity 9-bit code words. Fifty-six information words are represented by fifty-six code words having DSP$_+$=+1 and fifty-six code words having DSP$_+$=−1. Fourteen information words are represented by fourteen code words having DSP$_+$=+1 and fourteen code words having DSP$_+$=−2. The code word representation of the remaining information words may be obtained from the illustrated chart. Thus, in some pairs of code words, the NRZI disparities thereof will be equal and opposite. However, in other pairs of code words, the NRZI disparities thereof may exhibit different absolute values. For example, in some pairs, the disparities may be +2 and −3, respectively, +3 and −4, respectively, +3 and −5, respectively, and so on.

Since the available positive disparity 9-bit code words exceed the number of code words needed to represent the 8-bit information words, certain ones of the positive disparity code words may be omitted and not selected. For example, positive disparity code words having relatively long run lengths may be omitted. Hence, those code words having DSP$_+$=+9 and DSP$_+$=+8 need not be selected to represent any information words. By avoiding such code words, the run length of sequential binary "0"s is reduced and, therefore, the overall DC component of the NRZI code words likewise is minimized. FIG. 4 represents the run-length of two successive 9-bit code words [100000000] and [000000001]. If these two successive code words are selected sequentially, as may be possible if both are used to encode respective 8-bit information words, then the run-length of the binary "0"s included in such sequential code words is equal to 16-bit intervals. It is seen that the second binary "1" occurs 17-bit cells after the first binary "1". The NRZI disparity of the first code word [100000000] is DSP$_+$=−8, and the NRZI disparity of the second code word [000000001] is DSP$_-$=−8. However, by eliminating the use of either of these code words from representing an information word, the possibility of such undesired long run lengths, with the resultant high digital sum variation, is avoided. As a practical matter, the available code words which may be used to represent the information words are selected such that the maximum interval between successive transitions in the NRZI waveform is equal to fourteen bit cells. This is because the maximum DSP$_+$ is equal to +4, as illustrated by the chart of FIG. 3. Consequently, the maximum interval between transitions is obtained if a code word having $DSP_+ = -8$ is followed by a code word having $DSP_+ = +4$ (which, in NRZI format, would have a $DSP_- = -4$). As a result, the digital sum variation of such two consecutive code words having $DSP_+ = -8$ and $DSP_- = -4$ would be $-12$.

The chart in FIG. 3 illustrates that seventy 9-bit code words are available with zero NRZI disparity. It is possible that the contents of the information words to be encoded are such that many will be represented by respective ones of such zero disparity code words. Consequently, if the existing digital sum variation is a relatively large positive or negative value, this digital sum variation might not be reduced quickly. This possibility can be avoided, however, if the zero disparity code words are selected to represent those information words which do not exhibit a very high probability of occurrence. Statistically, therefore, more of the information words will be represented by non-zero disparity code words; and these code words are selected such that the NRZI disparities thereof will, when combined with the digital sum variation, rapidly reduce the DSV towards zero.

The available NRZI 9-bit type II code words having the indicated disparities $DSP_+$ are represented by the chart shown in FIG. 5. It is seen for the type II NRZI code word that no code word is present having zero disparity. Furthermore, since it is assumed that each code word is formed of an odd number of bits, the absolute values of the NRZI disparities thereof are all odd numbers. Of course, if a type II NRZI code word contains an even number of bits, then the NRZI disparities thereof will have absolute values that are even numbers, including $DSP_+ = 0$.

From the chart of FIG. 5, it is seen that each information word may be represented by a pair of type II NRZI code words having equal and opposite NRZI disparities. A relatively simple encoding technique thus may be provided. The first, or most significant bit of the type II 9-bit code word may be either a binary "1" or a binary "0", and the remaining bits may be precisely equal to the 8-bit code word which is represented thereby. Depending upon the first, or most significant bit of the code word, the NRZI disparity of the entire code word will be either positive or negative.

Figure 6A:
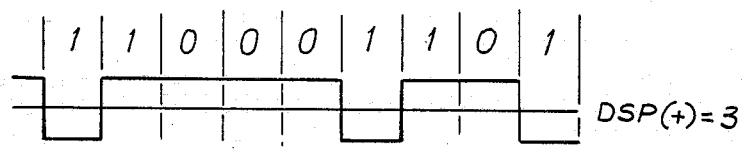
FIGS. 6A-6D are waveform diagrams representing equal and opposite disparities of respective pairs of type II code words.
Figure 6B:
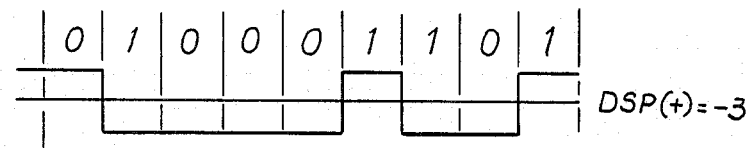

FIGS. 6A-6D illustrate type II NRZI code word waveforms which demonstrate the foregoing simplified encoding technique. Let it be assumed that the information word is [10001101]. Assuming positive entry polarity (ENT+), FIG. 6A represents the NRZI code word whose first, or most significant bit, is a binary "1" and FIG. 6B represents the NRZI code word whose most significant bit is a binary "0". It is appreciated that both of the code words shown in FIGS. 6A and 6B represent the information word [10001101]. The code word commencing with a binary "1" (FIG. 6A) has the NRZI disparity $DSP_+ = +3$. The code word commencing with a binary "0" (FIG. 6B) has the disparity $DSP_+ = -3$.

Figure 6C:
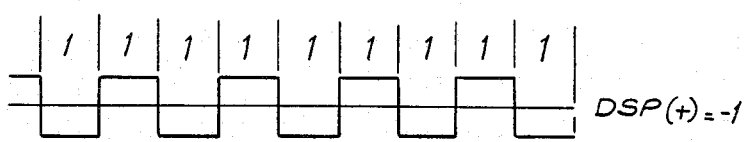
Figure 6D:
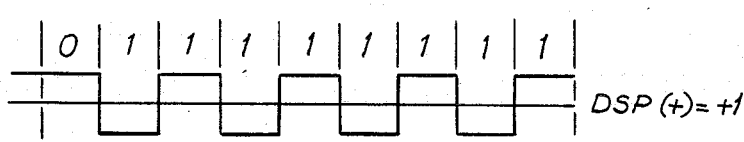

FIGS. 6C and 6D represent the pair of type II NRZI code words which represent the information word [11111111]. In FIG. 6C, the code word commences with a binary "1" and has the disparity $DSP_+ = -1$. In FIG. 6D, the code word commences with a binary "0" and has the disparity $DSP_+ = +1$. Thus, it is seen from FIGS. 6A-6D that a particular information word may be represented by a pair of type II NRZI code words having equal and opposite disparities merely by adding a binary "1" or "0" prefix bit to the information word.

Although the encoding technique for type II NRZI code words is simplified with respect to the encoding technique for type I NRZI code words, the maximum interval between successive transitions is greater for type II code words than for type I. However, since the type II NRZI code words do not exhibit zero disparity, the digital sum variation derived from successive code words may be brought rapidly towards zero. For example, since the minimum absolute value of the disparity of the type II NRZI code words is 1, and since the maximum absolute value of the digital sum variation is 9, the digital sum variation will be brought equal to 0 after nine successive code words have been produced.

The foregoing discussion of the type I and II NRZI code words has assumed that each code word is formed of an odd number of bits (e.g. 9 bits). The present invention also contemplates type I and II NRZI code words having an even number of bits. The characteristics of the encoded words is a function not only of the type of NRZI modulation that is used but also of whether the number of bits included in the code word is odd or even. The characteristics of the NRZI encoding in accordance with the present invention may be summarized as follows:

CODE WORD HAVING AN ODD NUMBER OF BITS

Type I

1. Some of the available code words have zero disparity.
2. Undesired patterns in the code word may be eliminated, such as those code words which result in undesirably long run lengths.
3. The maximum interval between successive transitions is relatively shorter than that of type II code words.
4. Since some of the code words exhibit zero disparity, it may happen that the digital sum variation is not returned to zero for a relatively long period of time. That is, a relatively large number of code words may be produced before the digital sum variation is nulled.
5. There is a relationship between the beginning and concluding polarities of the code word and the NRZI disparity of that word. More particularly, EXIT=ENT when DSP is odd; and EXIT≠ENT when DSP is even.

From the chart of FIG. 3, it is recognized that the range of DSP of the type I code words may be constrained. For example, the maximum positive DSP for a 9-bit code word representing an 8-bit information word is +4.

Type II NRZI Code Word

1. None of the type II code words exhibits zero disparity.
2. To minimize redundancy, $m = n+1$; and all of the available m-bit code words must be used.
3. The maximum interval between successive transitions in the type II code words is larger than that for the type I code words.
4. A maximum of $m+1$ code words might be needed in order to return the digital sum variation to zero.
5. The disparity of each code word is odd.
6. The encoding technique is relatively simple. The code word may be produced merely by adding a prefix binary "1" or "0" to the information word. Decoding also is simplified because the most significant bit may be ignored, thus automatically resulting in the decoded information word.

Of the foregoing features items 3 and 6 of the type I NRZI code are advantageous, and item 6 of the type II NRZI code is advantageous.

CODE WORD HAVING AN EVEN NUMBER OF BITS

Type I Code Words

1. Some of the available code words have zero disparity. However, only a relatively small number of such zero disparity code words are available.

2. The relationship between the beginning and concluding polarity of the code word is a function of the disparity thereof. More particularly, EXIT=ENT when DSP is even; and EXT≠ENT when DSP is odd.

3. More of the code words exhibit positive NRZI disparity than negative.

4. The possible range of digital sum variation derived from successive code words may be relatively larger than that for type II code words.

Type II Code Words

1. A relatively large number of code words are available having zero disparity.

2. Each code word exhibits even disparity.

3. There are the same number of code words having positive disparity as having zero disparity.

4. The range of the digital sum variation derived from successive code words may be constrained to a smaller range than that for the type I code words.

From the foregoing comparison of characteristics of the code words having an even number of bits, it is seen that type II NRZI modulation is more advantageous.

In accordance with one embodiment of the present invention, an 8-bit information word is represented by a 9-bit code word. The code word may exhibit zero, positive or negative NRZI disparity. Predetermined ones of the information words are represented by respective zero disparity code words on a "one-to-one" relationship. That is, each of these information words is represented by one and only one zero disparity code word. Likewise, each such zero disparity code word represents one and only one information word. Each of the remaining information words is represented by a pair of non-zero disparity code words. In each such pair of code words, one code word exhibits positive NRZI disparity and the other exhibits negative NRZI disparity. The absolute values of the disparities in each pair of code words may be equal or, as mentioned above, may differ from each other.

The encoding technique of the present invention proceeds on the principle that, if an information word is represented by a pair of non-zero disparity code words, the particular code word which is selected to represent an information word will have a disparity which, when combined with the then-present digital sum variation, will prevent that digital sum variation from increasing and, preferably, will change the DSV towards zero. Thus, if the DSV exhibits positive polarity, the selected code word will exhibit negative NRZI disparity. Conversely, if the DSV exhibits negative polarity, the selected code word will exhibit positive NRZI disparity.

The decoding of the NRZI code word is relatively simple. The NRZI waveform is demodulated to obtain the NRZ waveform; and the demodulated code word then is decoded to obtain the information word. Since each code word represents one and only one information word, a relatively simple decoding technique may be used, such as storing all of the information words in a memory device and using the demodulated code word to address that memory device and thus read out the appropriate information word therefrom.

Figure 7:
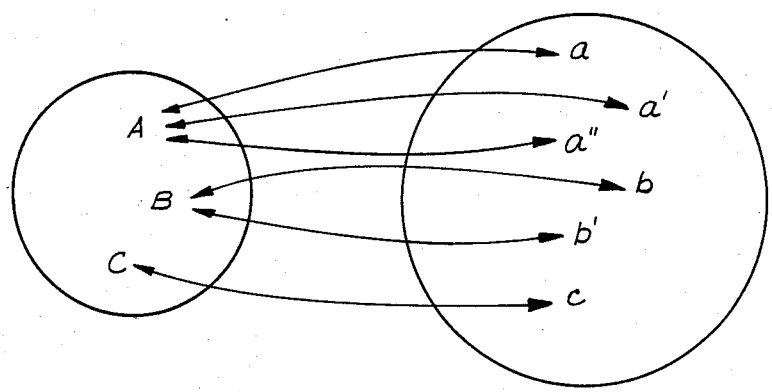
FIG. 7 is a diagram which is useful in understanding the relationship between the n-bit information words and the m-bit code words.

FIG. 7 diagrammatically represents the relationships that might be present between the information and code words. The n-bit information words may be represented by the circle shown in the left-hand portion of the figure, and the m-bit code words may be represented by the larger circle shown in the right-hand portion. An information word A may be represented by, for example, code word a having zero disparity, code word a′ having positive disparity and code word a″ having negative disparity. Alternatively, an information word B may be represented by a code word b having positive disparity and also by a code word b′ having negative disparity. Alternatively, code word b may have zero disparity with code word b′ having negative disparity; or code word b′ may have zero disparity with code word b having positive disparity. As a further alternative, information word C may be represented by one and only one code word c, this code word having zero, positive or negative disparity.

From the foregoing, it is appreciated that the following separate criteria may be used to encode the information words:

(1) Each information word is represented by a code word having zero disparity. In that event, there are no selection criteria because only one code word is present for each information word. Furthermore, notwithstanding the particular code word which is selected, the overall digital sum variation will remain equal to zero.

(2) Each information word may be represented by one code word having zero disparity and another code word having positive disparity (DSP$_+$=+). With this criterion, the digital sum variation may increase if the entry polarity ENT of each code word is positive. However, the DSV will be nulled ultimately if a generally equal number of code words have negative entry polarity (ENT−).

(3) Each information word is represented by a code word having zero disparity and a code word having negative disparity (DSP$_+$=−). This is the opposite to criterion (2) above.

(4) Each information word is represented by a code word having positive disparity and also by a code word having negative disparity. The particular code word is selected as a function of the digital sum variation. That is, if the sign or polarity of the DSV is positive, then the code word having negative disparity is selected. Conversely, if the sign or polarity of the DSV is negative, then the code word having positive disparity is selected.

(5) Each information word is represented by a code word having zero disparity and also by a code word having positive disparity and also by a code word having negative disparity. Although this requires the greatest number of code words and, thus, the greatest redundancy, it insures that the digital sum variation will be rapidly nulled.

Figures 8, 9:
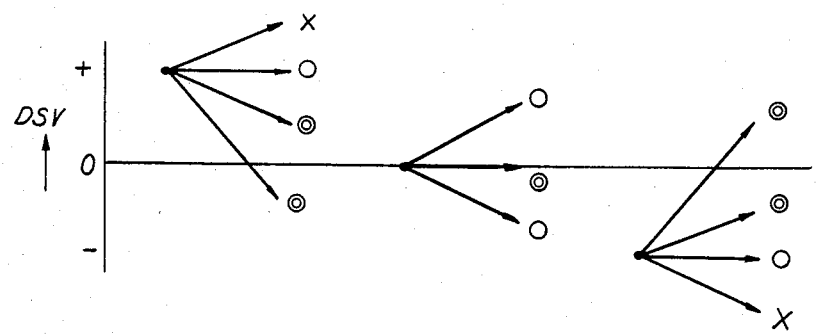
FIG. 8 is a chart indicating the selection criteria for encoding an information word as a function of the digital sum variation and the polarity at the conclusion of the preceding code word.
FIG. 9 is a diagrammatic representation of the encoding selection process in accordance with the present invention.

FIG. 8 illustrates a chart that summarizes the foregoing selection criteria for each of criteria (1)–(5) when the digital sum variation is positive, zero or negative, and when the entry polarity ENT is positive or negative. The presence of a circle in a particular area represents the code word having the indicated disparity that is selected for the particular DSV and ENT conditions. It is appreciated that, in accordance with criterion (1), since only a single code word is provided for each information word, there is no selectivity. Thus, notwithstanding the DSV and ENT conditions, only one code word may be used to represent an information word.

For criterion (2), it is seen that, when the digital sum variation is positive or zero, the code word having zero NRZI disparity is selected. However, when the digital sum variation is negative, the code word having positive NRZI disparity is selected. it is recalled that, when the entry polarity is negative (ENT−), the NRZI disparity $DSP_-$ is opposite the disparity for ENT+. That is, $DSP_- = -DSP_+$.

The selectivity of criterion (3) is seen to be opposite that of criterion (2). Thus, whenever the digital sum variation is positive, the code word having negative disparity is selected.

From criterion (4), it is seen that, when the digital sum variation is zero, the code word having either positive or negative disparity may be selected.

From criterion (5), it is seen that, when the digital sum variation is zero, the code word having zero disparity is selected. Furthermore, when the digital sum variation is not equal to zero, the code word whose disparity is of a polarity opposite to the polarity of the digital sum variation is selected. This tends to reduce the digital sum variation towards zero, or null.

From the chart shown in FIG. 8 and from the foregoing description, it is appreciated that a primary factor, or criterion, in the selection of an available code word to represent an information word is whether the disparity of that code word tends to reduce or at least prevent an increase in, the then-present digital sum variation. FIG. 9 is a diagrammatic representation of this code word selection. In FIG. 9, the black point represents the present digital sum variation, and it is seen that the double circles represent those code words having disparities which tend to reduce the digital sum variation, or at least prevent it from increasing substantially. The double circles represent those code words which are desirably selected. The single circle represents those code words having either zero disparity (which, of course, would result in no change in the digital sum variation) or a small positive or negative disparity. Such single circles thus represent those code words which are acceptable but, if a code word represented by a double circle is available to represent the information word, the single-circle code word would not be selected. Of course, if the particular information word which is to be encoded cannot be represented by a double-circle code word, then the acceptable single-circle code word will be used.

In FIG. 9, those code words represented by "X" are not to be used. The selection of such code words would otherwise result in an increase in the digital sum variation. It will be appreciated, therefore, that if an information word is represented by an "X" code word, it also is represented by a double-circle code word (having opposite polarity disparity), and the latter would be selected. Of course, the selection of the particular code word to represent the information word is dependent upon the then-present digital sum variation.

From the chart shown in FIG. 3 and from the accompanying description thereof, it is recalled that some information words may be represented by pairs of code words whose disparities are of opposite polarities but different absolute values. If the then-present digital sum variation is equal to zero, and if one of those information words is received for encoding, then the particular code word which is selected is the one whose disparity has lower absolute value. In that case, although the updated digital sum variation would, of necessity, change from its zero, or null, value, the quantity of that change is minimized. From criterion (4) in FIG. 8, it is seen that, when the digital sum variation is equal to zero, either of the non-zero disparity code words included in the pair which represent the received information word may be selected. With the foregoing constraint, however, the one code word having the smaller absolute value of disparity is used in order to maintain a minimal digital sum variation.

When a particular code word is selected to represent the received information word, as described above, the then-present digital sum variation must be updated by combining that digital sum variation with the NRZI disparity of the selected code word. Furthermore, the entry polarity (ENT) must be determined. It is recalled that, in accordance with the present NRZI modulation format, the entry polarity of the NRZI code word is made equal to the exit polarity (EXIT) of the immediately preceding code word. The foregoing may be summarized by the following equations: When ENT+, $$DSV \leftarrow DSV + DSP+ \qquad (i)$$

$$ENT \leftarrow EXIT+$$

When ENT−, $$DSV \leftarrow DSV + DSP- \qquad (ii)$$

$$= DSV - DSP+ \qquad (iii)$$

$$ENT \leftarrow EXIT -$$

$$= - EXIT +$$

Equations (ii) and (iii) conform with the description set forth previously wherein, when the entry polarity (ENT) is negative, the NRZI disparity $DSP_-$ of the code word is of opposite polarity but with the same absolute value as the NRZI disparity $DSP_+$ if the entry polarity ENT had been positive. That is, $DSP_- = -DSP_+$.

In accordance with the present invention, some, if not all, of the information words are represented by at least two code words. That is, at least two code words are assigned to each of such information words, the code words assigned to a respective one of these information words having NRZI disparities of opposite polarities. The selection of the particular code word to represent the received information word is dependent upon the entry polarity ENT of the NRZI-modulated code word which, of course, is equal to the exit polarity EXIT of the immediately preceding code word, the digital sum variation which has been derived from all of the preceding NRZI code words, and the NRZI disparity of the code word itself. Based upon these factors, the particular code word is selected such that its NRZI disparity constrains the digital sum variation within a predetermined range about zero.

Figure 10:
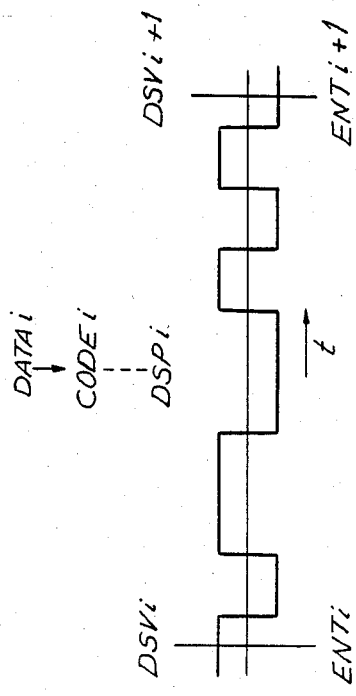
FIG. 10 is useful in understanding the manner in which successive information words are encoded.

FIG. 10 may be helpful in understanding the manner in which the i-th information, or data word, is encoded into the i-th code word. Let it be assumed that the digital sum variation which had been derived from the preceding (i−1) code words, and is present when the i-th information word is to be encoded, is represented as $DSV_i$. The entry polarity $ENT_i$ of the i-th NRZI code word is, of course, equal to the exit polarity $EXIT_{i-1}$. Signals representing $DSV_i$ and $ENT_i$ may be produced and stored. A particular embodiment by which such signals are generated and stored is described in greater detail below. Accordingly, the particular code word $CODE_i$ which is selected to represent the information word $DATA_i$ may be selected in accordance with the chart shown in FIG. 8. Upon selecting this code word $CODE_i$, the digital sum variation is updated by algebraically combining the NRZI disparity $DSP_i$ of that code word with the digital sum variation $DSV_i$, thus producing $DSV_{i+1}$. Furthermore, the exit polarity EXIT of the code word $CODE_i$ is detected, and is used to represent the entry polarity $ENT_{i+1}$ of the next-following code word. For example, and as described above, if type I NRZI modulation is used and if the number of bits included in the code word is odd, then $ENT_{i+1}=EXIT_i=ENT_i$ if $DSP_i$ is odd; and $ENT_{i+1}=EXIT_i\neq ENT_i$ if $DSP_i$ is even. Based upon the updated digital sum variation $DSV_{i+1}$ and the entry polarity $ENT_{i+1}$ of the next-following NRZI code word, the selection or encoding of the next information word $DATA_{i+1}$ will proceed in the above-described manner.

Let it be assumed that, initially, the digital sum variation is equal to zero ($DSV=0$). The initial entry polarity may be either positive or negative, and is represented as $ENT_o$. The encoding technique for the i-th information word is a function of $DSV_i$ and $ENT_i$, the latter expressions being determined as follows:

$$DSV_i = \sum_{j=0}^{i-1} DSP_j \quad (i=1, 2, 3, \ldots) \qquad (1)$$

$$ENT_i = ENT_o \oplus \sum_{j=0}^{i-1} EXIT_{+j} \quad (i=1, 2, 3, \ldots) \qquad (2)$$

The entry and exit polarity ENT and EXIT may be represented as, for example, a binary "1" corresponding to positive polarity and a binary "0" corresponding to negative polarity. It is appreciated, therefore, that $ENT_o$ may be represented as either a binary "1" or a "0", depending upon the assumption of the initial entry polarity. The summation of the EXIT polarities may be achieved by modulo 2 addition.

Figure 11:
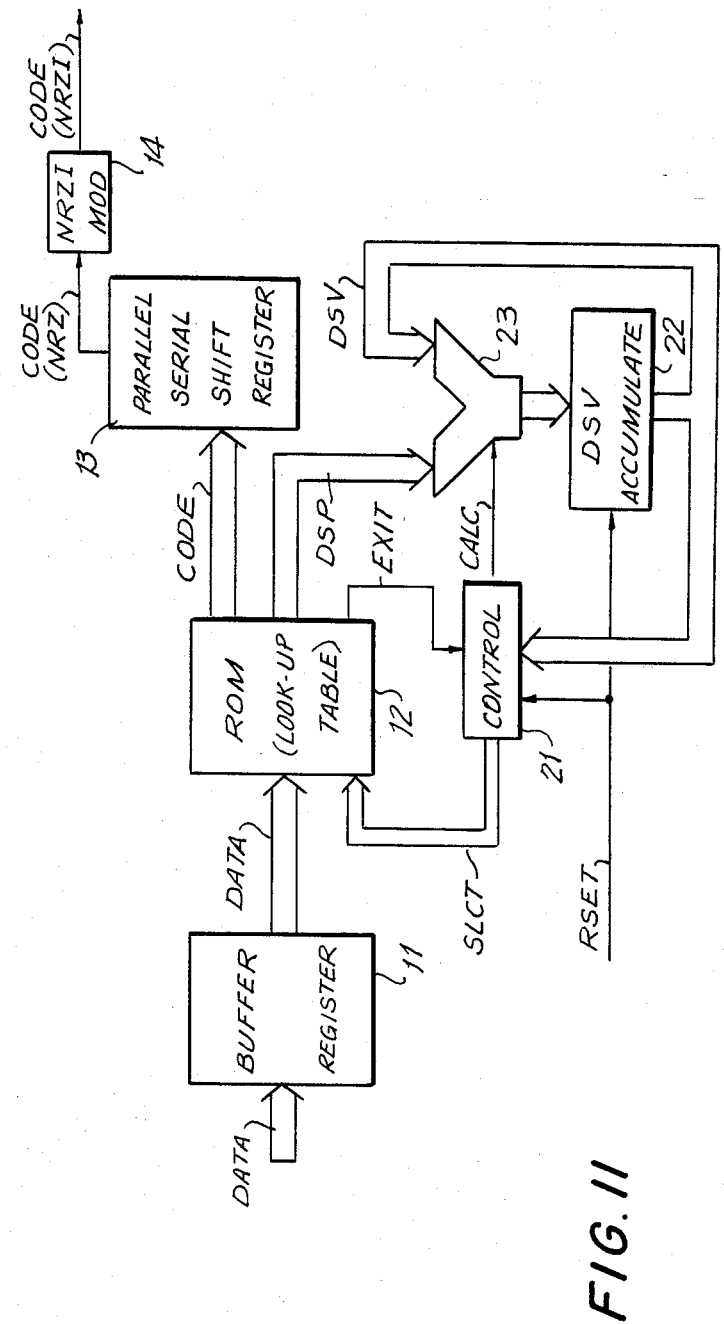
FIG. 11 is a block diagram of one embodiment of the present invention.

In practice, the chart of FIG. 8 representing the selection criteria may result in code words having a large number of redundant bits and, moreover, relatively complicated criteria for selection. For simplification, the preferred embodiment of the present invention implements criteria (1) and (4). If type I NRZI modulation is used, some information words are represented by, or assigned with, code words having zero disparity and the remaining information words are represented by, or assigned with, pairs of code words having disparities of opposite polarities. If type II NRZI modulation is adopted and each code word is formed of an odd number of bits, none of the information words will be represented by, or assigned with zero disparity code words. One embodiment of an encoder in accordance with the present invention is illustrated in FIG. 11.

The illustrated encoder includes a buffer register 11, a storage device, such as a read only memory (ROM) 12, an NRZI modulator 14, a DSV determining circuit 23 and a control circuit 21. Buffer register 11 is connected to receive an input information word (DATA) and to store that information word temporarily. The output of buffer register 11 is coupled to address terminals of ROM 12.

The ROM may comprise a conventional addressable memory device having individual code words stored in each addressable location therein. The particular locations in which the code words are stored is dependent upon which information word is to be represented by a particular code word. More particularly, ROM 12 serves to assign each information word with one or more code words. The ROM thus may be thought of as a look-up table whereby a particular location therein is addressed by a respective information word, thereby reading out the code word stored at that addressed location. Hence, the particular code word which is assigned to the received information word is read out therefrom. ROM 12 also stores, in a corresponding addressable location, a digital signal representing the disparity DSP of the addressed code word. Hence, when a particular location in ROM 12 is addressed by the received information word, the code word stored at that addressed location as well as the disparity DSP of that code word are read out from the ROM.

ROM 12 also stores a representation of the exit polarity EXIT of the code word read out from the location addressed by the received information word. For example, for type I NRZI modulation, if each code word is formed of an odd number of bits, then a binary "0" may be read out from ROM 12 to represent that the exit polarity EXIT of the read out code word is equal to the entry polarity ENT of that code word; and a binary "1" may be read out when the exit polarity EXIT is not equal to the entry polarity ENT of that code word. As mentioned above, if the disparity DSP of the code word is odd, then $EXIT=ENT$; and if the disparity of that code word is even, then $EXIT\neq ENT$. Hence, since the disparity DSP of each code word is known, the signal representing the exit polarity EXIT may be preset into a suitable location in ROM 12. This signal may, for example, be a predetermined bit in the particular location in which the disparity DSP of the code word is stored.

Preferably, the code word read out of ROM 12 is a parallel-bit word, such as a 9-bit word. This code word CODE is supplied to a parallel-to-serial shift register 13 from which it is serially read out. The serially read out code word is in NRZ format and is supplied to NRZI modulator 14 whereat the code word is modulated in NRZI format. In accordance with this invention, NRZI modulator 14 may modulate the code word in type I or type II format. For the purpose of the present discussion, let it be assumed that NRZI modulator 14 modulates the code word in type I format.

DSV determining circuit 23 may comprise an algebraic combining circuit and is adapted to algebraically combine the NRZI disparity DSP of the code word read out from ROM 12 with the digital sum variation which has been derived from the preceding code words. In one embodiment, the DSV determining circuit functions as a summing circuit for summing the NRZI disparity with the digital sum variation. In an alternative embodiment, DSV determining circuit 23 is responsive to a calculating control signal CALC either to sum the disparity signal DSP with the digital sum variation or to subtract the disparity signal therefrom. The calculating control signal CALC functions, in this embodiment, to select either a summing or subtracting operation. From equation (iii) above, it is seen that, if the disparity signal DSP represents the NRZI disparity for each code word having positive entry polarity, then the calculating control signal CALC functions to control DSV determining circuit 23 to subtract the disparity signal from the digital sum variation in the event that the entry polarity is negative (ENT−).

The output of DSV determining circuit 23 is coupled to a storage device 22 which functions as a DSV accumulating circuit. The updated digital sum variation produced by DSV determining circuit 23 is supplied to and temporarily stored in DSV accumulating circuit 22. As illustrated in FIG. 11, the stored digital sum variation is supplied from the DSV accumulating circuit to DSV determining circuit 23 so as to be updated with the disparity signal DSP representing the disparity of the next read out code word. The temporarily stored digital sum variation also is supplied from DSV accumulating circuit 22 to control circuit 21.

The control circuit is additionally supplied with the EXIT signal and, depending upon the digital sum variation and EXIT signals supplied thereto, produces a ROM select signal SLCT. This ROM select signal is supplied to ROM 12 and, in one embodiment, cooperates with the information word stored in buffer register 11 to generate a ROM address. For example, if the digital sum variation stored in DSV accumulating circuit 22 exhibits positive polarity, control circuit 21 is responsive thereto to produce the ROM select signal SLCT which functions to select a code word having negative NRZI disparity. Thus, if the received information word is assigned with a positive disparity code word and also with a negative disparity code word, the ROM select signal SLCT is adapted to select the negative disparity code word to be read out from the ROM. Conversely, if the digital sum variation stored in DSV accumulating circuit 22 exhibits negative polarity, control circuit 21 is responsive thereto to produce the ROM select signal SLCT which selects the code word having positive disparity which is assigned to the received information word.

Control circuit 21 also functions to produce the calculating control signal CALC in response to the EXIT signal supplied thereto from ROM 12. This EXIT signal is used to detect the polarity of the conclusion of the immediately preceding NRZI code word that is produced by NRZI modulator 14, thereby controlling DSV determining circuit 23 either to sum the disparity signal with or subtract that disparity signal from the digital sum variation stored in DSV accumulating circuit 22. Alternatively, if DSV determining circuit 23 merely is a summing circuit, control circuit 21 may function to respond to the EXIT signal so as to detect the polarity of the immediately preceding NRZ code word and, if that polarity is negative, to invert the disparity signal DSP which represents the disparity of the code word read out of ROM 12 in response to the received information word. This inversion operation is in accordance with equation (iii) and the foregoing description wherein $DSP_- = -DSP_+$.

FIG. 11 also illustrates a reset signal RSET, which is generated by a suitable source (not shown) supplied to control circuit 21 and to DSV accumulating circuit 22. The purpose of this reset signal is to preset the value of the digital sum variation stored in DSV accumulating circuit 22 to, for example, zero. The reset circuit also functions to preset control circuit 21 to produce the select signal SLCT which selects the initial code word that is assigned to the initially received information word. For example, if the received information word is assigned with a pair of non-zero disparity code words, then the reset signal RSET is used by control circuit 21 to produce the select signal SLCT whereby the code word having positive disparity ($DSP_+$) and positive entry polarity ENT is read out from ROM 12. Thereafter, the select signal SLCT, calculating control signal CALC and EXIT signal are produced as a function of the digital sum variation stored in the DSV accumulator and the actual NRZI disparity of the code word read out from ROM 12 in the manner described above.

It is appreciated that, as an alternative, the initial entry polarity ENT and/or the disparity DSP may be assumed to be negative.

In operation, ROM 12 may be thought of as a look-up table, as mentioned above, or code word map. For example, the code words may be stored in two separate sections of the memory, one section containing code words with positive disparity and the other section containing code words of negative disparity. The zero disparity code words, if any, may be stored in one of these sections, or in a separate, third section of the memory, or may be duplicated such that the same zero disparity code word is stored in the first section and also in the second section. The particular section of ROM 12 which is addressed may be determined by the ROM select signal SLCT. Thus, if the digital sum variation stored in DSV accumulating circuit 22 exhibits positive disparity, control circuit 21 may respond thereto to produce the ROM select signal which selects that section of ROM 12 in which code words having negative NRZI disparities are stored. Conversely, if the digital sum variation stored in DSV accumulating circuit 22 exhibits negative disparity, control circuit 21 may respond thereto to produce the ROM select signal which selects, or enables, that section of ROM 12 in which the code words having positive NRZI disparity are stored. Then, the particular code word which is stored in the selected, or enabled section and which is assigned to the received information word is read out from the ROM. That is, the received information word is used to address the selected, or enabled section of the ROM.

The code word read out from ROM 12 is serialized by parallel-to-serial shift register 13, and the serial code word then is modulated in NRZI format.

In addition to reading out the code word, the disparity of that particular code word also is read out from the ROM. If it is assumed that each code word is stored in the ROM together with its $DSP_+$ disparity, then this $DSP_+$ disparity is read out and algebraically combined in DSV determining circuit 23 with the accumulated digital sum variation. Depending upon the detected polarity at the conclusion of the preceding NRZI code word, control circuit 21 controls the DSV determining circuit either to add or subtract the $DSP_+$ disparity. The resultant updated digital sum variation then is stored in DSV accumulating circuit 22.

In a particular implementation of the embodiment shown in FIG. 11, the EXIT signal is determined in accordance with equation (2) above, wherein EXIT=ENT if the NRZI disparity of the code word read out of ROM 12 is odd, and EXIT≠ENT if the NRZI disparity is even, assuming that each code word is formed of an odd number of bits. The converse of the foregoing obtains if each code word is formed of an even number of bits. Moreover, in the particular implementation to be described, the exit polarity EXIT is used in combination with the polarity, or sign, of the accumulated digital sum variation to select or enable the appropriate section of ROM 12.

It will be appreciated that calculating control signal CALC may be omitted if DSV determining circuit 23 merely is a summing circuit, and if ROM 12 stores both DSP$_+$ and DSP$_-$ disparities. Alternatively, and as will be described, if ROM 12 stores only the DSP$_+$ disparity, the signal representing that disparity may be inverted in the event that the polarity of the conclusion of the immediately preceding NRZI code word is detected as being negative.

Figure 12:
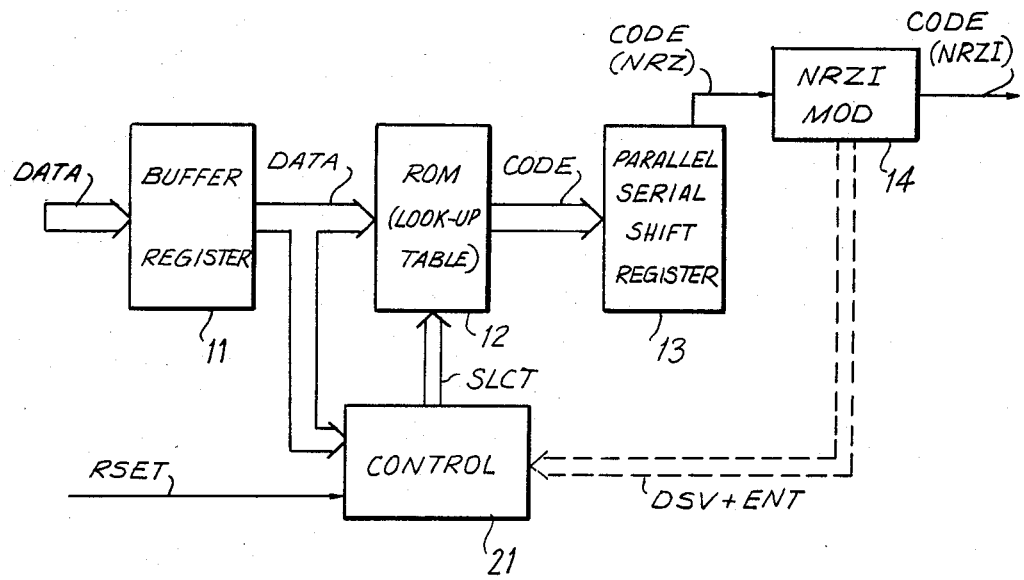
FIG. 12 is a general block diagram illustrating the principle under which the present invention proceeds.

FIG. 12 is a block diagram of a general embodiment of the present invention, and includes buffer register 11, memory device 12, parallel-to-serial shift register 13, NRZI modulator 14 and control circuit 21. These circuits have been described in detail hereinabove. The embodiment of FIG. 12 differs from that shown in FIG. 11 in that the FIG. 12 embodiment provides no separate circuitry for determining the digital sum variation. It is assumed, rather, that the digital sum variation, as well as the entry and exit polarities of each NRZI code word, may be derived directly from NRZI modulator 14. The broken lines shown in FIG. 12 represent that control circuit 21 may determine the digital sum variation and detect the entry polarity from NRZI modulator 14 to produce the ROM select signal SLCT.

As an example, the NRZI code word produced by NRZI modulator 14 may be coupled to an up/down counter whose count is adapted to be incremented or decremented at each half bit interval depending upon whether the NRZI code signal exhibits positive or negative polarity, such as the positive or negative polarities shown in FIGS. 1, 2, 6 and 10. The resultant count of the up/down counter at the end of each NRZI code word thus corresponds to the digital sum variation. Likewise, the entry polarity ENT may be determined merely by detecting the polarity of the conclusion of the immediately preceding NRZI code word. For example, the NRZI code word produced by NRZI modulator 14 may be supplied to a flip-flop circuit whose state at the completion of the code word is an indication of the exit polarity thereof.

Figure 13:
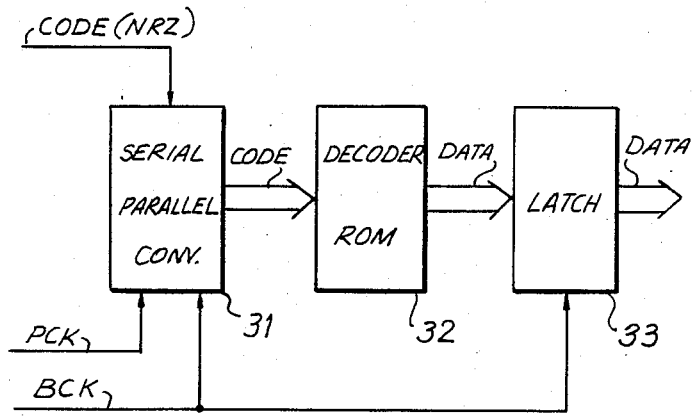
FIG. 13 is a block diagram of a decoder which may be used to decode the digital signals derived from the encoder of the present invention.

FIG. 13 is a block diagram of a decoder which may be used in conjunction with the encoder shown in FIGS. 11 or 12, and is adapted to decode each received NRZI code word to recover the original information word therefrom. The decoder includes a suitable NRZI demodulator (not shown) which demodulates the NRZI code word to produce an NRZ code word therefrom. This NRZ code word is supplied, serially-by-bit, to a serial-to-parallel converter 31. The output of this serial-to-parallel converter is comprised of a parallel-bit code word which is coupled to a ROM 32 and is adapted to address the ROM in accordance with the contents of the parallel-bit code word. It may be appreciated that ROM 32 may be complementary to ROM 12 and is adapted to store in addressable locations each of the information words. Such storage locations are addressed by the received code word so as to read out therefrom the particular information word to which that received code word has been assigned. The output of ROM 32 is coupled to a latch circuit 33 from which the original information word is recovered.

Also shown in FIG. 13 are a bit clock signal PCK and a word sync clock signal BCK. The bit clock signal PCK is synchronized with the serial-bit NRZ code word and is adapted to "clock" successive bits of the code word into serial-to-parallel converter 31. A suitable source (not shown) may be provided to supply the bit clock signal PCK.

The word sync clock signal BCK may be generated by, for example, counting the bit clock pulses until a predetermined count (e.g. 9) is attained. The word sync clock signal BCK is adapted to identify the end of one serial-bit code word and, thus, the beginning of the next code word. Upon the occurrence of the word sync clock signal BCK, serial-to-parallel converter 31 may supply the code word, parallel-by-bit, to ROM 32. Also, upon the occurrence of the word sync clock signal, latch circuit 33 is triggered, or latched, to store the decoded information word therein as read out from ROM 32.

As an alternative, ROM 32 may comprise a gating circuit, or other logic circuit. For example, if type II NRZI modulation is used, the logic circuit may be of the type which ignores the prefix, or most significant bit of the code word, thus recovering only the remaining bits thereof. As mentioned above, and as shown in FIG. 6, such remaining bits of the NRZI code word are constituted by the original bits of the information word.

A particular implementation of the embodiment shown in FIG. 11 is illustrated in FIG. 14. In this implementation, buffer register 11 is comprised of latch circuits 111 and 112; ROM 12 is comprised of separate read only memories 121, 122, 123 and 124; parallel-to-serial shift register 13 is comprised of shift registers 131, 132 and 133; NRZI modulator 14 is comprised of flip-flop circuit 141 and exclusive-OR gate 142; control circuit 21 is comprised of flip-flop circuit 211 and exclusive-OR gates 212 and 213; DSV determining circuit 23 is comprised of exclusive-OR gates 231, 232, 233, 234 and 235 and full adders 236 and 237; and latch circuit 22 is comprised of multi-bit latch 221.

In a typical application of the present invention, each received information word represents a sample of a video signal, and the NRZI-encoded signals are recorded on, for example, a DVTR. The code words may be arranged in block form, and each block may be prefaced by a suitable synchronizing pattern and synchronizing words. Latch circuit 111 is adapted to receive an 8-bit information word formed of, for example, DATA$_0$–DATA$_7$. An identifying signal IDS is supplied to latch circuit 112 and is adapted to indicate whether an information word is being received or whether the aforementioned synchronizing information should be generated. For example, a received information word is indicated by the IDS signal as a binary "1", and synchronizing information is indicated by the IDS signal as a binary "0". The particular synchronizing pattern and synchronizing words are determined by MODE 1 and MODE 2 bits. These bits, together with the IDS signal, are stored in latch circuit 112. As illustrated in FIG. 14, latch circuits 111 and 112 are connected to receive a clock signal CK1, and are adapted to be latched in response to the clock signal. When latched, the information word is stored in latch circuit 111, and the MODE 1 and MODE 2 bits, together with the IDS signal, are stored in latch circuit 112.

Read only memories 121 and 122 include an enable input $\overline{S}$. These read only memories are enabled to be addressed and accessed when a binary "0" enabling signal is supplied to the enable input $\overline{S}$. As illustrated, an inverter 113 is coupled to receive the stored IDS signal from latch circuit 112 and to supply the inverted version of the IDS signal to the enable input $\overline{S}$ of read only memories 121 and 122. If the IDS signal is a binary "1", inverter 113 supplies an enabling binary "0" to read only memories 121 and 122. Conversely, if the IDS signal is a binary "0", thus indicating that the synchronizing pattern and synchronizing words should be generated, inverter 113 supplies a disabling binary "1" to these read only memories.

Read only memories 123 and 124 are similar to read only memories 121 and 122, and the enable inputs $\overline{S}$ thereof are coupled directly to latch circuit 112 to receive the IDS signal. Read only memories 123 and 124 thus are enabled when the IDS signal is a binary "0".

The data bits of the information word stored in latch circuit 111 are supplied as address bits to address terminals A–H of each read only memory 121 and 122. Read only memory 121 stores the respective code words which are assigned to the information words; and read only memory 122 stores a respective 5-bit disparity signal representing the disparity of each stored code word, as well as a bit representing the exit polarity of that code word. In practice, since the code word is a 9-bit word, and since each read only memory operates to store an 8-bit word, the least significant bit of the code word is stored in read only memory 122. Thus, when addressed by the 8-bit information word, the 9-bit code word is read out of read only memories 121 and 122, provided that these read only memories are enabled by the IDS signal. Also, as the 9-bit code word is read out, the 5-bit disparity signal representing the disparity of that code word is read out from read only memory 122. Finally, the signal representing the exit polarity also is read out of read only memory 122 in response to the address formed of the 8-bit information word. For the purpose of the present discussion, the EXIT bit is a binary "0" when the entry and exit polarities of the NRZI code word are equal, and the EXIT bit is a binary "1" when the entry and exit polarities of that code word are not equal.

Read only memories 123 and 124 are addressed by the MODE 1 and MODE 2 bits stored in latch circuit 112, and also by the memory select signal SLCT. When read only memories 123 and 124 are enabled, suitable synchronizing patterns and information words are read out therefrom depending upon the states of the MODE 1 and MODE 2 bits. It is recognized that, when read only memories 123 and 124 are enabled, read only memories 121 and 122 are disabled. The converse of this also obtains.

The code word read out of read only memories 121 and 122 is formed of code bits $CODE_0$–$CODE_8$. These code bits are supplied to shift registers 131–133 which are clocked by clock pulses CK2 generated by a suitable source (not shown). Clock pulses CK2 serve to read out the code bits $CODE_0$–$CODE_8$ in serial form, whereby each code bit is serially shifted through the cascaded shift registers. The least significant bit thus is shifted from shift register 133 through shift register 132 and then through shift register 131. The more significant bits of the code word are stored in shift register 131 and then are shifted out in serial form therefrom. Clock pulses CK2 occur either in the generally central portion of a bit cell interval so as to designate the mode I NRZI format, or at the beginning of each bit cell interval to designate the type II NRZI format. These clock pulses also are supplied to the clock input of a D-type flip-flop circuit 141.

Shift registers 131–133 also are coupled to read only memories 123 and 124 so as to receive the respective bits which constitute the synchronizing pattern and synchronizing words that may be read out from these read only memories when the IDS signal is a binary "0".

The code word which is serially shifted out of shift registers 131–133 passes through exclusive-OR gate 142 to the D-input of flip-flop circuit 141. In the event that a preceding bit was a binary "1", as represented by the state of flip-flop circuit 141, the next-following bit shifted out of the shift registers is inverted. If the preceding bit was a binary "0", then the next bit shifted out of the shift registers is not inverted. Thus, transitions occur only in response to a binary "1" code bit; and the position at which each transition is produced is dependent upon the time of occurrence of the clock pulses CK2.

A latch circuit 134 is supplied with clock pulses CK1 and CK2, and the outputs from this latch circuit are coupled through an inverter 135 and a NAND gate 136 and fed back thereto so as to produce a shift/load signal that is supplied to a shift/load input of each of shift registers 131, 132 and 133. When the shift/load signal exhibits a first binary state, such as a binary "0", the shift registers are loaded with the parallel code bits supplied thereto. When the shift/load signal is changed over, the contents of the shift registers are serially shifted out in response to clock pulses CK2. Latch circuit 134 thus is timed to produce the load signal after nine consecutive code bits have been shifted out of the shift registers.

Exclusive-OR gate 212 of control circuit 21 is coupled to receive the exit bit at one input thereof, and the output of this exclusive-OR gate is supplied to the D input of D-type flip-flop circuit 211. The Q output of flip-flop circuit 211 is coupled to the other input of exclusive-OR gate 212. This Q output represents the polarity at the conclusion of the preceding code word and, thus, the entry polarity of the next-following code word. More particularly, if the Q output of the flip-flop circuit is a binary "1", then the entry polarity ENT is negative. If the Q output of this flip-flop circuit is a binary "0", then the entry polarity is positive. It is seen that the entry polarity selectively inverts the exit bit if the entry polarity is negative, as represented by a binary "1". Thus, if the next code word which is read out of read only memories 121 and 122 is accompanied by the exit bit of binary "0", representing that the entry and exit polarities of that next word are equal, and if the Q output of flip-flop circuit 211 is a binary "1", representing that the exit polarity of the preceding word and, thus, the entry polarity of this next code word is negative, exclusive-OR gate 212 serves to invert the binary "0" exit bit, whereupon a binary "1" is stored in flip-flop circuit 211. Consequently, flip-flop circuit 211 produces a binary "1" at its Q output to indicate that the exit polarity of the code word read out from read only memories 121 and 122, and thus the entry polarity of the next-following code word, is negative. When the next code word is read out from read only memories 121 and 122, the exit bit associated with that word also is read out. If this exit bit now is a binary "1" to represent that the exit polarity of the read out word differs from the entry polarity thereof, exclusive-OR gate 212 will be supplied with a binary "1" at each of its inputs. The binary "1" of the Q output of flip-flop circuit 211 serves to invert the binary "1" exit bit, whereupon the flip-flop circuit now is supplied with and stores a binary "0". Hence, since the entry polarity of the code word read out from read only memories 121 and 122 was negative, but the exit polarity thereof was opposite the entry polarity, flip-flop circuit 211 now properly stores a binary "0" to indicate that the exit polarity of that code word, and thus the entry polarity of the next-following word, is positive.

From the foregoing discussion, it is seen that flip-flop circuit 211 stores a bit representing the entry polarity of the next-following code word, wherein "1" equals ENT− and "0" equals ENT+. If this indication of the entry polarity is a binary "1", then the exit bit next read out of read only memory 122 is inverted by exclusive-OR gate 212.

The entry polarity bit stored in flip-flop circuit 211 is used as the calculating control signal CALC. It is seen that this entry polarity bit is supplied as one input to each of exclusive-OR gates 231–235. The remaining inputs of these exclusive-OR gates are coupled to receive a respective bit of the 5-bit disparity signal read out of read only memories 121 and 122. The most significant disparity bit $DSP_4$ represents the sign, or polarity, of the disparity and is supplied to exclusive-OR gate 231; and the least significant bit $DSP_0$ is supplied to exclusive-OR gate 235. In the event that the entry polarity of the read out code word is negative (CALC="1"), the disparity signal is inverted by exclusive-OR gates 231–235.

The read out disparity signal is supplied to full adder circuits 236 and 237. These full adder circuits function as a 5-bit full adder and serve to sum the 5-bit disparity signal with a 5-bit representation of the accumulated digital sum variation. This 5-bit digital sum variation signal is stored in latch circuit 22 and is supplied to the remaining inputs of the full adder comprised of adder circuits 236 and 237. In practice, the full adder circuit is adapted to sum two 4-bit signals. In the present embodiment, the disparity and digital sum variation signals are 5-bit signals. Hence, to accommodate the 5-bit signals, two 4-bit full adder circuits 236 and 237 are used.

The output of the full adder circuits 236 and 237 comprise the updated 5-bit digital sum variation, and this updated digital sum variation signal is stored in latch circuit 221. The latch circuit is supplied with clock signals CK1 and, as is recognized, serves to latch the updated digital sum variation therein upon, for example, the trailing edge of the clock pulse.

Thus, when a code word is read out from read only memories 121 and 122 in response to the information word which is used to address the read only memories, the disparity of that code word also is read out. The disparity signal is selectively inverted in the event that the entry polarity of that code word is negative. Furthermore, the disparity signal, or the selectively inverted disparity signal, is summed with the digital sum variation that had been stored in latch circuit 221. The result of that summation then is stored as the updated digital sum variation in the latch circuit.

It is recognized that the entry polarity bit stored in flip-flop circuit 211 selectively determines whether the disparity signal read out from read only memory 122 is added to or subtracted from the digital sum variation. If the entry polarity bit is a binary "1" so as to invert the disparity signal, the read out disparity is subtracted from the digital sum variation.

Exclusive-OR gate 213 is supplied with the entry polarity bit stored in flip-flop circuit 211 and also with the most significant bit of the accumulated digital sum variation stored in latch circuit 221. This most significant bit represents the polarity of the digital sum variation. This exclusive-OR gate produces the read only memory select signal SLCT which, when a binary "1", addresses that section of the read only memories in which the code words having positive disparity are stored. If the output of exclusive-OR gate 213 is a binary "0", then that section of the read only memories is selected, or enabled, in which the code words having negative disparity are stored.

Let it be assumed that the entry polarity bit stored in flip-flop circuit 211 is a binary "0". Let it be further assumed that the accumulated digital sum variation stored in latch circuit 221 exhibits positive disparity. For the purpose of the present explanation, a digital sum variation equal to zero also will be assumed to have positive polarity. Accordingly, the most significant bit, or sign bit, representing the digital sum variation is a binary "0". Exclusive-OR gate 213 produces the binary "0" read only select signal, whereupon that section in which are stored code words having negative disparity is enabled. Thus, the input information word addresses the read only memories to read out the assigned code word having negative disparity. This negative disparity when summed with the positive digital sum variation stored in latch circuit 221, serves to reduce the digital sum variation toward its zero, or null value.

Now, let it be assumed that the sign bit of the digital sum variation is a binary "1" representing negative digital sum variation. If it is still assumed that the entry polarity bit stored in flip-flop circuit 211 is a binary "0", then exclusive-OR gate 213 produces a binary "1" to enable that section of the read only memories in which code words are stored having a positive disparity. A code word having positive disparity thus is read out from the read only memories in response to the address formed of the input information word. The positive disparity of that code word also is read out and, when summed with the accumulated digital sum variation, tends to reduce the digital sum variation to its zero value.

Let it now be assumed that the entry polarity bit stored in flip-flop circuit 211 is a binary "1". If the sign bit of the digital sum variation stored in latch circuit 221 is a binary "0", exclusive-OR gate 213 produces a binary "1" to enable that section of the read only memories in which code words having positive disparity are stored. However, since the entry polarity bit has been assumed to be a binary "1", this positive disparity, when read out from read only memory 122, is inverted to a negative disparity and is summed with the positive digital sum variation stored in latch circuit 221. Thus, the proper code word is read out of the read only memories, and the digital sum variation is updated toward its zero value.

Finally, if the entry polarity bit is binary "1" and if the sign bit of the digital sum variation is a binary "1" to represent negative polarity thereof, exclusive-OR gate 213 produces a binary "0" to enable that section of the read only memories in which code words having negative disparity are stored. When the code word and its negative disparity are read out, the binary "1" entry polarity bit serves to invert the negative disparity to a positive value. This positive disparity signal now is summed with the negative digital sum variation and tends to reduce the digital sum variation toward its zero value.

Thus, it is recognized that, when the entry polarity bit is a binary "0", the sign bit of the digital sum variation stored in latch circuit 221 is used, as is, as the read only memory select signal SLCT. However, when the entry polarity bit is a binary "1", the sign bit of the digital sum variation is inverted.

While the foregoing has described in detail the manner in which the disparity of the read out code word is determined and the digital sum variation is updated, it should be appreciated that a similar operation is carried out when read only memories 121 and 122 are disabled and read only memories 123 and 124 are enabled to read out the synchronizing pattern and synchronizing words therefrom.

If desired, the embodiment shown in FIG. 14 may be modified such that the Q output of flip-flop circuit 141 is used as an indication of the entry polarity bit in place of the combination of flip-flop circuit 211 and exclusive-OR gate 212. In this modification, read only memory 122 need not store the exit polarity bit of each code word.

While the present invention has been particularly shown and described with reference to certain preferred embodiments, it will be readily appreciated by those or ordinary skill in the art that various changes and modifications in form and details may be made without departing from the spirit and scope of the invention. The code word, as mentioned herein, may be formed of an even or odd number of bits. Furthermore, the NRZI format may be of the type I or type II format. Still further, any of the encoding criteria represented by the chart shown in FIG. 8 may be used to select the proper code word. In the specific embodiment shown in FIG. 14, each information word may be represented by a pair of code words having equal and opposite disparities or, alternatively, some of the information words may be represented by respective zero disparity code words and the remaining information words may be represented by pairs of code words, the code words in such pairs having disparities of opposite polarities. Furthermore, such non-zero disparities may be of equal absolute value or, alternatively, some information words may be represented by one code word whose negative disparity is of greater absolute value than the positive disparity code word which also is assigned to represent that information word.

It is intended that the appended claims be interpreted as including the foregoing as well as other changes and modifications.

What is claimed is:

1. A method of converting successive n-bit information words into successive m-bit NRZI code words, with m>n, comprising the steps of assigning to each n-bit information word at least one m-bit code word having a respective NRZI disparity such that at least some of said n-bit information words are assigned with respective pairs of m-bit code words, each said respective pair of m-bit code words having a positive NRZI disparity code word and a negative NRZI disparity code word, the absolute values of the disparaties of the code words in each said respective pair being unequal; determining the digital sum variation of the preceding successive m-bit NRZI code words; detecting the polarity of the conclusion of the immediately preceding m-bit NRZI code word; selecting an assigned m-bit code word to represent the next n-bit information word as a function of the NRZI disparity of the selected code word and the determined digital sum variation; and modulating a code signal in NRZI format in accordance with said selected m-bit code word such that the modulated code signal has the same initial polarity as said detected polarity, and the NRZI disparity of said selected m-bit code word, when combined with said determined digital sum variation, tends to prevent the digital sum variation from increasing.

2. The method of claim 1 wherein m is an odd number of bits and each of said remaining n-bit information words not assigned with a respective pair of m-bit code words is assigned with a zero NRZI disparity code word.

3. The method of claim 2 wherein said step of modulating comprises providing a transition substantially during the central portion of a code bit interval to represent a bit of predetermined logical sense and providing no transition during a code bit interval to represent a bit of opposite logical sense.

4. The method of claim 3 wherein said bit of predetermined logical sense is a binary "1".

5. The method of claim 1 wherein m is an even number of bits and each of said remaining n-bit information words not assigned with a respective pair of m-bit code words is assigned with a zero NRZI disparity code word.

6. The method of claim 1 further comprising the steps of providing a signal representing the NRZI disparity of the selected m-bit code word, and algebraically summing the provided disparity signal with a signal representing said determined digital sum variation to thereby update the digital sum variation.

7. The method of claim 6 further comprising the steps of storing each m-bit code word, storing the NRZI disparity signal of each stored m-bit code word; and using said determined digital sum variation, said detected polarity and said next n-bit information word to read out the m-bit code word assigned to said next information word together with its NRZI disparity signal.

8. The method of claim 7 further comprising the step of presetting an initial polarity of a first m-bit NRZI code word; and wherein said step of detecting the polarity of the conclusion of the immediately preceding code word comprises reversing said polarity as a function of the read out NRZI disparity signal.

9. The method of claim 8 wherein m is an odd number of bits and said polarity is reversed if the value of said read out NRZI disparity signal has an even value.

10. The method of claim 8 wherein m is an even number of bits and said polarity is reversed if the value of said read out NRZI disparity signal has an odd value.

11. The method of claim 7 further comprising the step of storing a representation of the polarity of the conclusion of each m-bit NRZI code word, and reading out said polarity representation with said m-bit code word and NRZI disparity signal.

12. The method of claim 1 further comprising the steps of storing each m-bit code word assigned to each n-bit information word; storing the NRZI disparity of each stored m-bit code word; using said n-bit information word as a portion of a read-out address; generating another portion of said read-out address as a function of said determined digital sum variation; and reading out the stored m-bit code word and NRZI disparity in response to said read-out address.

13. The method of claim 12 wherein said step of determining the digital sum variation comprises summing the read out NRZI disparity with the present digital sum variation when the detected polarity of the conclusion of the immediately preceding m-bit NRZI code word is of predetermined polarity and subtracting the read out NRZI disparity from the present digital sum variation when the detected polarity is of opposite polarity.

14. Apparatus for NRZI encoding of successive n-bit information words, comprising encoding means for encoding each n-bit information word into an m-bit code word (m>n), said encoding means including means for assigning at least one unique m-bit code word having a respective NRZI disparity to each n-bit information word so that respective pairs of m-bit code words are assigned to at least some of said n-bit information words, each said respective pair of m-bit code words having a positive NRZI disparity code word and a negative NRZI disparity code word, the absolute values of the disparities of the code words in each said respective pair being unequal, DSV determining means for determining the digital sum variation of successive m-bit NRZI code words that have preceded the encoded m-bit code word, and selecting means for selecting an assigned m-bit code word to represent the next n-bit information as a function of the NRZI disparity of that code word and the determined digital sum variation; polarity indicating means for indicating the polarity of the conclusion of the immediately preceding m-bit NRZI code word; and modulating means for modulating a code signal in NRZI format in accordance with said selected m-bit code word such that the modulated code signal has the same initial polarity as the detected polarity, and the NRZI disparity of said selected m-bit code word, when combined with the determined digital sum variation, tends to prevent the digital sum variation from increasing.

15. The apparatus of claim 14 wherein said means for assigning assigns a respective m-bit code word of zero disparity to each of the remaining n-bit information words.

16. The apparatus of claim 15 wherein said modulating means produces a transition signal substantially during the central portion of a code word bit interval to represent a bit of predetermined logical sense and no transition to represent a bit of opposite logical sense.

17. The apparatus of claim 14 wherein said DSV determining means comprises means for producing a signal representing the NRZI disparity of each selected m-bit code word, and algebraic combining means for algebraically combining the NRZI disparity signal with the digital sum variation to update said digital sum variation.

18. The apparatus of claim 17 wherein said means for assigning comprises a storage means for storing in addressable locations the respective m-bit code words assigned to each n-bit information word, and wherein said means for producing the NRZI disparity signal includes said storage means; and wherein said selecting means comprises address generating means for generating an address as a function of the next n-bit information word and the updated digital sum variation, said selecting means using said address to read out from said storage means the m-bit code word assigned to said n-bit information word and, where than one code word is assigned to that information word, the code word whose NRZI disparity tends to reduce the digital sum variation is read out.

19. The apparatus of claim 18 wherein said address generating means includes means for modifying said address in response to the indicated polarity of the conclusion of the immediately preceding m-bit NRZI code word, whereby an m-bit code word having positive disparity is read out from said storage means when said indicated polarity is of a first type and an m-bit code word having negative disparity is read out from said storage means when said indicated polarity is of a second, opposite type.

20. The apparatus of claim 19 wherein said polarity indicating means comprises means for presetting a predetermined indication of polarity; and means for reversing said indication as a function of whether the value of the NRZI disparity of the read out m-bit code word is odd or even.

21. The apparatus of claim 20 wherein m is an odd number of bits and the polarity indication is reversed when the value of the NRZI disparity of the read out m-bit code word is even.

22. The apparatus of claim 20 wherein m is an even number of bits and the polarity indication is reversed when the value of the NRZI disparity of the read out m-bit code word is odd.

23. The apparatus of claim 19 wherein said polarity indicating means includes said storage means for additionally storing a signal representing whether the polarity of the m-bit code word read out therefrom has the same or different polarity at the conclusion thereof as at the beginning thereof; a presettable storage device for storing an initial preset polarity indicating signal; and comparator means for comparing the polarity representing signal read out from said storage means to the polarity indicating signal stored in said storage device to change over said polarity indicating signal when said polarity representing signal represents that the polarity of the read out m-bit code word at the conclusion thereof differs from the polarity at the beginning thereof.

24. The apparatus of claim 23 wherein said DSV determining means includes means for providing a sign signal representing the polarity of the determined digital sum variation; wherein said address generating means includes means for using said sign signal as a portion of said address, whereby a stored m-bit code word whose disparity is of a polarity opposite to that represented by said sign signal is selected; and wherein said means for modifying said address includes inverted means for selectively inverting said sign signal when the polarity signal stored in said storage device represents said second opposite type polarity.

25. The apparatus of claim 17 wherein said algebraic combining means is responsive to said polarity indicating means for summing said NRZI disparity signal with said digital sum variation when said indicated polarity is of a predetermined type and for subtracting said NRZI disparity signal from said digital sum variation when said indicated polarity is of the opposite type.

26. The apparatus of claim 14 wherein said selecting means includes means selectively responsive to the indicated polarity of the conclusion of the immediately preceding m-bit NRZI code word for selecting an assigned m-bit code word.

27. The apparatus of claim 26 wherein said means for assigning includes storage means having addressable storage locations in which respective m-bit code words and disparity signals representing the disparities thereof are stored; and said selecting means includes address generating means responsive to the next n-bit information word, the determined digital sum variation and the indicated polarity for generating an address identifying a location in said storage means from which an m-bit code word and its disparity signal are read.

28. The apparatus of claim 27 wherein said DSV determining means comprises summing means for summing the disparity signal read from said storage means with the previously determined digital sum variation to produce an updated digital sum variation signal having a sign bit representing the polarity of the updated digital sum variation signal, said sign bit being included in said address; and said address generating means includes inverting means for selectively inverting said sign bit when said indicated polarity is a predetermined type.

29. The apparatus of claim 28 wherein said summing means includes means for inverting the disparity signal read from said storage means when said indicated polarity is said predetermined type.

* * * * *